US005794099A

United States Patent [19]
Sheldon et al.

[11] Patent Number: 5,794,099
[45] Date of Patent: Aug. 11, 1998

[54] COPIER APPARATUS AND METHOD WITH FLEXIBLE SOURCE DOCUMENT ENTRY SCANNING WITH DISPLAY OF OPTIONS FOR SELECTION OF SOURCE

[75] Inventors: Eric George Sheldon, Holley; Ronald William Stephens; George Randall Vorhauer, both of Rochester, all of N.Y.

[73] Assignee: Eastman Kodak Company, Rochester, N.Y.

[21] Appl. No.: 343,407

[22] Filed: Nov. 22, 1994

[51] Int. Cl.$^6$ .................................................. G03G 21/00
[52] U.S. Cl. ............................... 399/82; 399/84; 399/85
[58] Field of Search ..................... 399/81, 82, 84, 399/85, 87

[56] References Cited

U.S. PATENT DOCUMENTS

| 4,076,408 | 2/1978 | Reid et al. ............... 399/17 |
| 4,162,848 | 7/1979 | Platt, III ................. 399/87 |
| 4,310,235 | 1/1982 | Lorenzo et al. ........... 399/84 |
| 4,693,590 | 9/1987 | Umeda .................... 399/84 |
| 4,757,348 | 7/1988 | Rourke et al. ......... 399/84 X |
| 4,822,021 | 4/1989 | Giannetti et al. ......... 271/35 |
| 4,884,097 | 11/1989 | Giannetti et al. ........ 355/23 |
| 4,922,350 | 5/1990 | Rombola et al. ......... 358/488 |
| 4,949,190 | 8/1990 | Thompson ............... 358/426 |
| 4,990,967 | 2/1991 | Colglazier et al. ....... 399/364 |
| 5,081,494 | 1/1992 | Reed et al. .............. 399/82 |
| 5,109,252 | 4/1992 | Schott, Jr. ............... 399/83 |
| 5,296,966 | 3/1994 | Hasuo .................... 358/498 |

FOREIGN PATENT DOCUMENTS 0478336  9/1991  European Pat. Off. ..

Primary Examiner—Arthur T. Grimley
Assistant Examiner—Quana Grainger
Attorney, Agent, or Firm—Norman Rushefsky

[57] ABSTRACT

A copier apparatus and method includes a scanning station for electronically scanning a set of document sheets to be copied as a copy job. The scanning station includes a platen or glass for supporting a document sheet scanned in a first mode wherein the document sheet is manually positioned on the platen by an operator and the scanning station operates in a second mode wherein document sheets are automatically fed to the station by a feeder. An operator control panel includes a display for indicating options for selection by an operator. These options include selection for scanning of a document sheet from the set in the first mode or the second mode. Another option available allows the operator to identify that all document sheets of the set are scanned for this copy job. A controller is responsive to signals generated pursuant to selections for actuating the scanning station to scan document sheets from the set in the first and second modes. After scanning a document sheet in the first mode, the operator control panel again indicates on the display an option allowing selection for scanning of a next document sheet from the set in the first mode or the second mode. Copying off the glass in an express glass mode is also disclosed. In this mode, a document sheet that is prepositioned on the glass, say during startup, may be automatically scanned at the appropriate time after the scanner first scans document sheets fed by the feeder. After scanning the document sheet on the glass and without further interaction by the operator, the process of feeding document sheets to the scanner resumes. After scanning of the document sheets, a writer produces a copy of the scanned document set as a copy job.

28 Claims, 10 Drawing Sheets

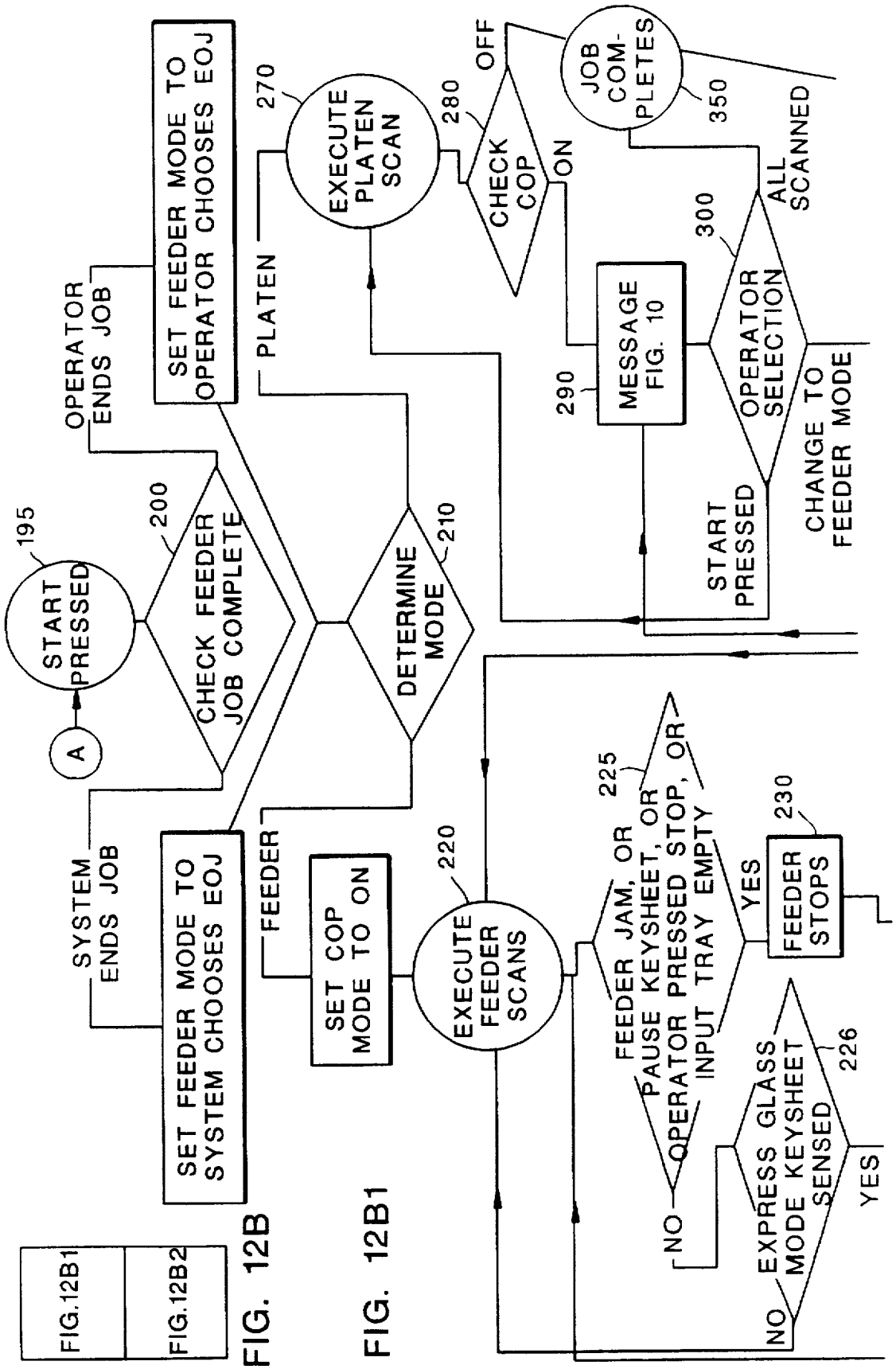

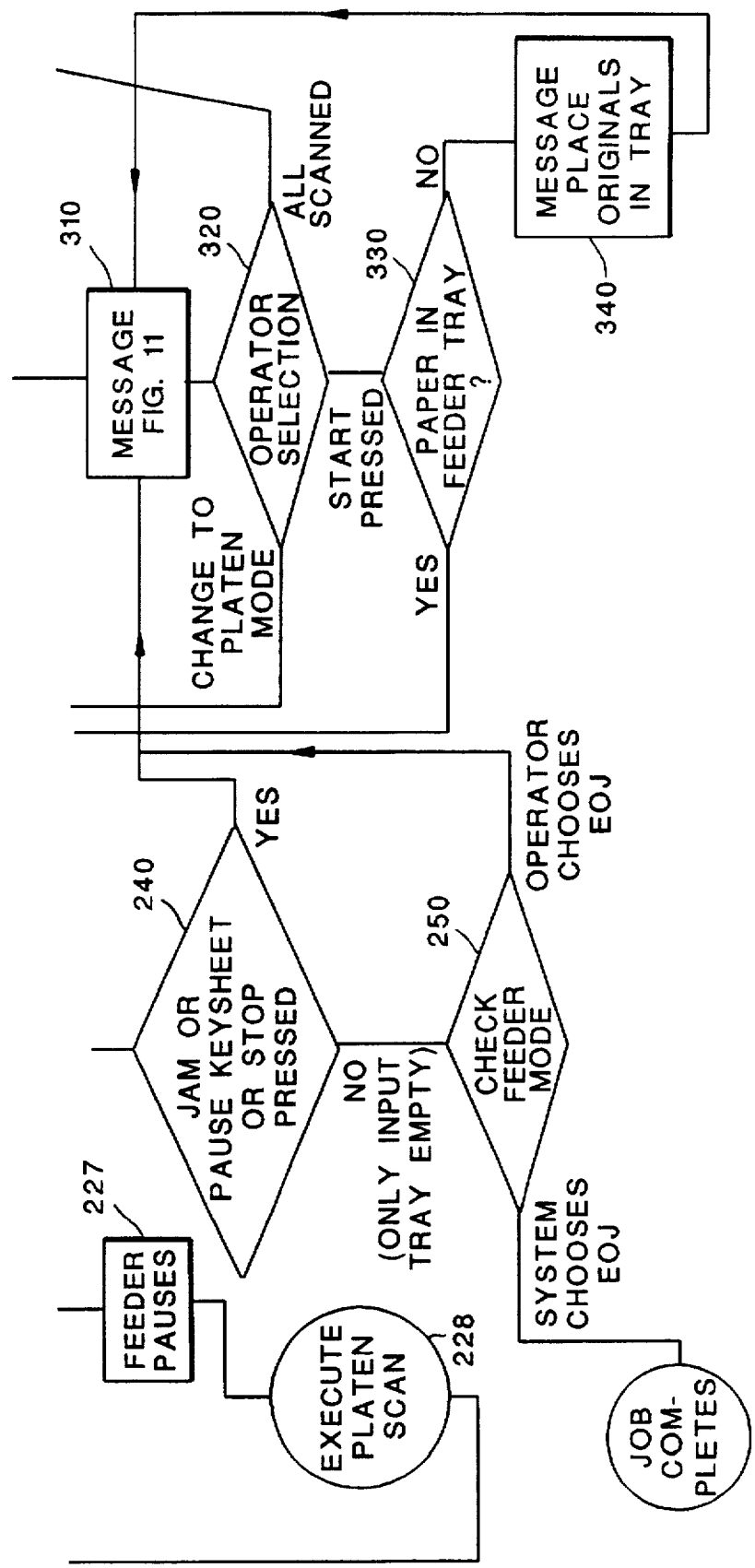
FIG. 12B2

COPIER APPARATUS AND METHOD WITH FLEXIBLE SOURCE DOCUMENT ENTRY SCANNING WITH DISPLAY OF OPTIONS FOR SELECTION OF SOURCE

BACKGROUND OF THE INVENTION

Cross-Reference to Related Application

This application is related to application Ser. No. 08/343, 405, filed on even date herewith and entitled "Copier Apparatus and Method with Improved Jam Recovery," and now U.S. Pat. No. 5,543,893.

1. Field of the Invention

The present invention relates generally to electronic copier apparatus such as electrostatographic copiers and methods for using same, and more particularly, to electronic copier apparatus and methods for making collated sets of reproductions.

2. Brief Description of the Prior Art

As noted in U.S. Pat. No. 4,076,408, it is well known in the prior art to provide convenience copiers with document feeders that present the individual document sheets to the copier, one-after another or seriatim, in a manner suitable for producing collated copies without a sorter.

In such apparatus, the original comprising a set of individual sheets, is automatically circulated for presentation to an optical exposure station, one sheet after another for copying.

More recently, an improvement in copying is provided by using electronic collating copiers such as described in U.S. Pat. No. 4,949,190. In such electronic copiers, image data is "read" by scanning an original document sheet with an electronic scanner so that optical image information on the original is converted to a stream of electronic video or image data. The video data may be stored in multi-page buffer memories. When a plurality of copy sets of a multi-page document are to be produced as a copy job, the stored video data for each page are repeatedly sent to the printer in proper page order such that the reproduction sets are automatically collated without use of a sorter.

As used herein, the term "electronic copier" is meant to refer to apparatus arranged for reading the image information on an original document sheet and converting the information to electronic data and for reproducing such image information on a receiver or copy sheet, which is a "hard copy." The term "copy job" is used in its conventional sense and implies operation of the apparatus in a copier mode to produce one or more hard copy sets from a production job requiring copying of an original document having one or more hard copy pages in accordance with predetermined parameters requested for producing said copy sets.

In known copiers such as the KODAK 1575 Copier/ Duplicator manufactured by Eastman Kodak Company, Rochester, N.Y., a copy job to be copied may have its originals scanned in via use of the platen or an automatic document feeder (ADF), but not both except when using key sheets in the ADF and a pause mode is selected for the key sheet. In this electronic copier, the user is allowed to select the platen or the ADF at the beginning of a job as the source for inputting originals. If the ADF is selected, the user is allowed to place key sheets in the original stack at appropriate locations to cause the ADF to pause when the key sheet is advanced by the feeder and sensed by key sheet sensors in the feeder. At this point, the operator of the electronic copier may request that a document sheet placed on the platen be scanned. On this electronic copier, a key sheet is a paper sheet with slotted holes which signals the copier that a different combination of features should be used and/or where pause has been preselected for key sheets causes the pause mode to be entered by the electronic copier and a prompt displayed allowing the operator to have scanning of one of the original document sheets by placement on the copier's platen. The key sheets are placed in the set of original document sheets directly before the original document sheet in the stack of originals that is to be changed or in which copies of the original document sheet scanned off the platen is to be positioned in finished copy sets. For every page to be scanned from the platen, a separate key sheet must be used. Key sheets may also be used for inserts or covers. When the ADF input paper tray becomes empty, the scanning of originals is complete, therefore the job is complete. If the platen is selected at the start of a job, the ADF cannot be used as a source of document input. However, one or more originals may be scanned from the platen in what is known as a collate off platen mode and a copy job produced using this mode.

The inventors have recognized that an electronic copier that is more flexible in allowing inputs from the ADF and the platen for scanning of a copy job would be highly desirable.

It is therefore an object of the invention to provide an electronic copier with improved flexibility in entry of image data for a copy job.

SUMMARY OF THE INVENTION

The above and other subjects of the invention which will become apparent upon reading the specification are realized by an electronic copier apparatus for producing copies of an original multisheet document set, the apparatus comprising means including a scanning station for electronically scanning a set of document sheets to be copied as a copy job, the scanning station including a platen for supporting a document sheet to be scanned in a first mode wherein the document sheet is manually positioned on the platen by an operator and the scanning station including means for scanning document sheets in a second mode wherein document sheets are automatically fed; feeder means for automatically feeding seriatim document sheets to the scanning station for scanning document sheets in the second mode; recording means for copying images of said document sheets; an operator control panel including display means for indicating an option for selection by an operator including selection for scanning of a document sheet from said set in said first mode or said second mode and generating signals in response to selections of scanning of certain of said document sheets in said set using said first mode and other document sheets in said set using said second mode; control means responsive to a signal actuating said scanning station for scanning said document sheet in said first mode and for controlling said operator control panel to again indicate on said display means an option allowing selection for scanning of a next document sheet from said set in said first mode or said second mode, said control means including means for actuating said recording means in response to said selections for producing a copy of said document set as a copy job.

In accordance with another aspect of the invention, there is provided a copier apparatus comprising means including a scanning station for electronically scanning a set of document sheets to be copied as a copy job, the scanning station including a platen for supporting a document sheet to be scanned in a first mode wherein the document sheet is manually positioned on the platen by an operator and the scanning station including means for scanning document sheets in a second mode wherein document sheets are automatically fed; feeder means for automatically feeding seriatim document sheets to the scanning station for scanning document sheets in the second mode; recording means for copying images of said document sheets; an operator control panel including display means for indicating options for selection by an operator including selection of scanning at least one of said documents in the first mode or scanning of document sheets in said second mode and an option allowing the operator to identify that all document sheets are scanned for this copy job; means responsive to operator inputs in response to display of said options for generating signals representing selections by said operator to said options; and control means responsive to said signals for actuating said scanning station for scanning said document sheets in said first mode and said second mode and for actuating said recording means for producing collated copies of said document set as a copy job.

In accordance with still another aspect of the invention, there is provided a method for copying document sheets comprising: electronically scanning a set of document sheets to be copied as a copy job, the scanning being performed both in a first mode wherein a document sheet of said set is manually positioned on a platen by an operator and in a second mode wherein document sheets are automatically fed; displaying an option for selection by an operator including selection for scanning of a document sheet from said set in said first mode or said second mode and generating a signal in response to selection of scanning of said document sheet in said first mode; in response to said signal scanning said document sheet in said first mode and again displaying an option allowing selection for scanning of a next document sheet from said set in said first mode or said second mode, and in response to selections from said options producing a copy of said document set as a copy job.

In accordance with yet another aspect of the invention, there is provided a method for copying document sheets comprising electronically scanning a set of document sheets to be copied as a copy job, the scanning being performed both in a first mode wherein a document sheet is manually positioned on the platen by an operator and in a second mode wherein document sheets are automatically fed; displaying options for selection by an operator including selection of scanning at least one of said documents in the first mode or scanning of document sheets in said second mode and an option allowing the operator to identify that all document sheets are scanned for this copy job; in response to operator inputs, that are in response to display of said options, generating signals representing selections by said operator to said options; and in response to said signals scanning said document sheets in said first mode and said second mode and producing collated copies of said document set as a copy job.

In accordance with still other aspects of the invention, there is provided an apparatus and method for electronically scanning a set of document sheets to be copied as a copy job, the scanning being performed in a first mode wherein a document sheet is manually positioned on a platen by an operator and in a second mode wherein document sheets are automatically fed, the method comprising the steps of displaying an option for selection by an operator of an operating mode wherein a document sheet from said set is prepositioned on said platen and is scanned automatically between document sheets of said set that are scanned in said second mode and generating a signal in response to selection of said operating mode; and, in response to said signal, feeding document sheets from said set for scanning the document sheets electronically and automatically and without operator intervention: (a) interrupting feeding of document sheets, (b) commencing a scan of the document sheet prepositioned on said platen, and (c) recommencing feeding of document sheets for scanning.

BRIEF DESCRIPTION OF THE DRAWINGS

In the detailed description of the preferred embodiments of the invention presented below, reference is made to the accompanying drawings in which:

FIGS. 12A and 12B illustrate a flowchart for operation of the copier apparatus of FIG. 1 in accordance with a preferred embodiment of the method and apparatus of the invention.

DETAILED DESCRIPTION OF THE PREFERRED EMBODIMENTS

The preferred embodiments are described herein with reference to an electrophotographic copier, but it will be understood that the invention can be used in any form of black and white or color electronic copier having an automatic means for feeding document originals. The description will be directed in particular to elements forming part of, or cooperating more directly with, apparatus in accordance with the present invention. It is to be understood that elements not specifically shown or described may take various forms well known to those skilled in the art.

Figure 1:
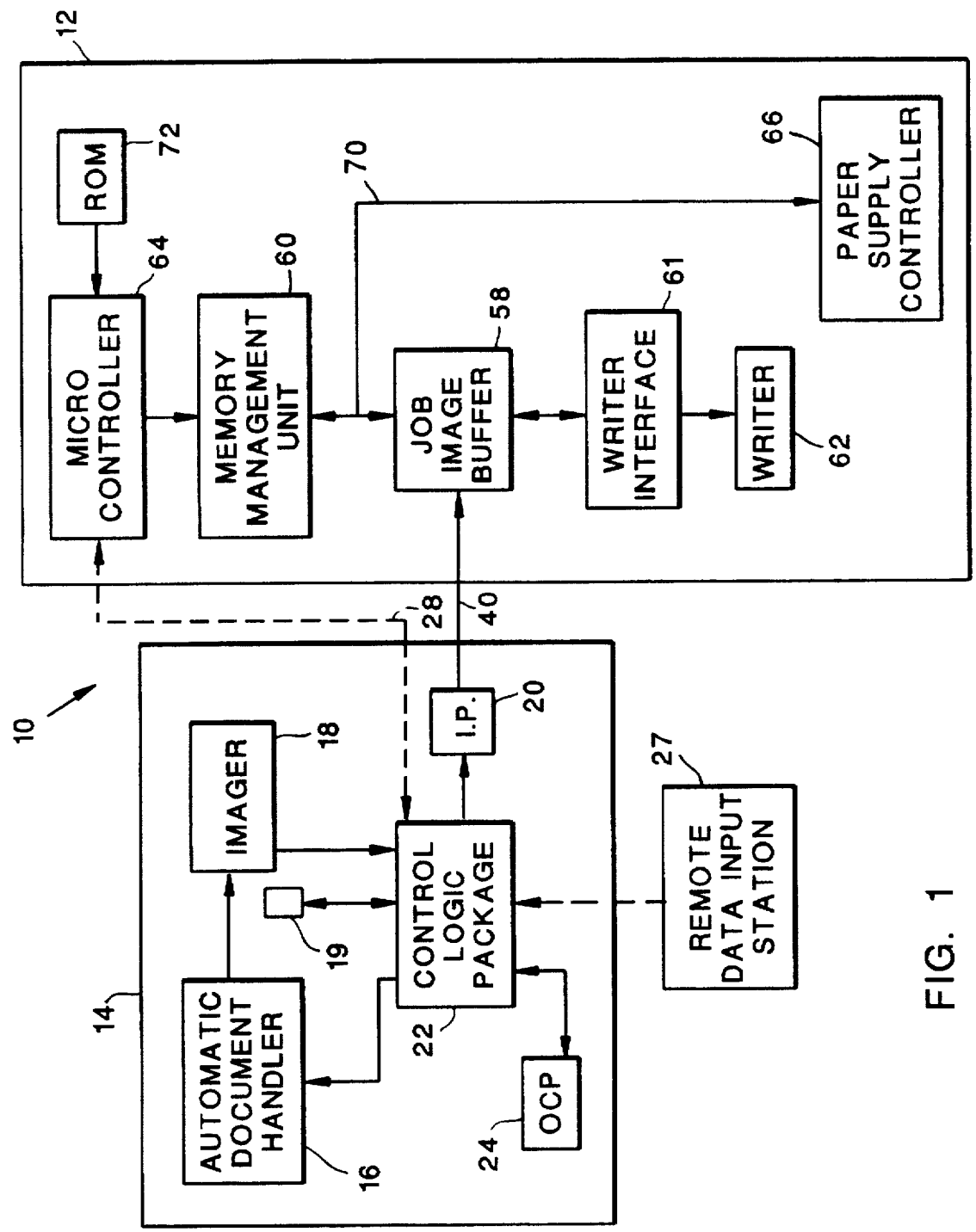
FIG. 1 is a block diagram of a copier apparatus according to a preferred embodiment of the present invention.

According to FIG. 1 and with reference to U.S. Pat. No. 5,109,252, a copier 10 includes a marking engine 12 and a document scanner assembly 14. Scanner assembly 14 comprises an automatic document feeder (ADF) or handler 16 such as, for example, a recirculating document feeder or other feeder that includes a hopper for storing a multisheet document original and feed rollers or belts for stream feeding document sheets seriatim past a scanner system and back to the hopper or to a second hopper. Focused light reflected from an original document sheet image is swept past an imager or scanner device 18 such as a linear array of photo transducers (photo diodes or charge coupled devices) for converting an image of the optical information on each original document sheet into electrical signals having values representative of the image density at associated pixel areas on the respective original document sheet.

As the scanning of the original document sheet proceeds in a direction perpendicular to the imager 18 and row of pixel areas, a series of output signals from the transducers are repetitively loaded into an associated shift register (not shown) and shifted out serially to provide a series of electrical signals having values representative of the image density of respective pixel areas in corresponding rows of pixel areas across the document image.

Scanner assembly 14 also includes a control logic package 22 having an integral data input station comprising an operator control panel 24 including buttons or input areas for the operator to input functions and to receive messages from the copier. Alternatively, setup instructions may be received via removable memory media or through signals provided from a remote data input station 27. An example of an electronic scanner is described in U.S. Pat. Nos. 4,822,021 and 4,884,097, the contents of which are incorporated herein by this reference.

Figure 2:
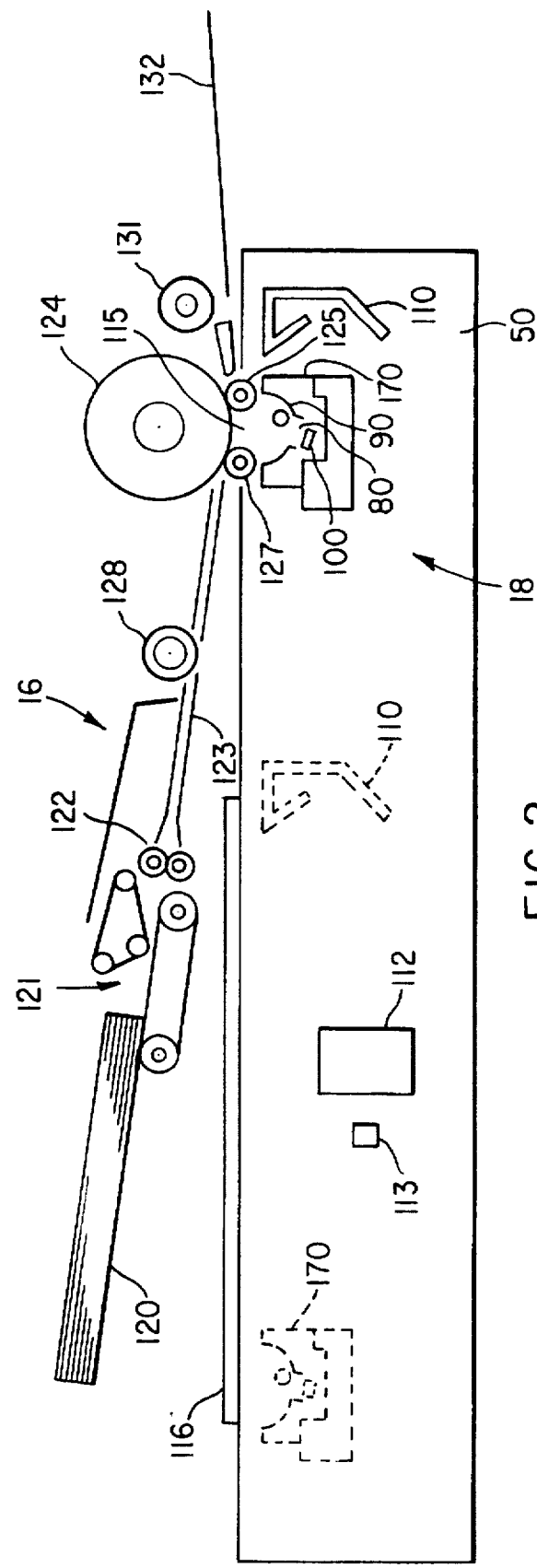
FIG. 2 is a schematic of an automatic document feeder and exposure station as known in the prior art and which is incorporated in the apparatus of the invention.

Referring to FIG. 2, an electronic scanner and automatic document handler or feeder as known in prior art, and which may be included in the apparatus of the invention, includes an illumination head 170 containing an exposure radiation source 80, an elliptical reflector 90 and a plane reflector 100. The illumination head 170 cooperates with a pair of movable mirrors 110, an objective 112 and an electrooptical image sensor having separately addressable pixels, for example, a CCD 113. Objective 112 and CCD 113 are stationary while the illumination head and pair of movable mirrors are movable from the position shown in solid lines to the position shown in phantom in FIG. 2.

When the illumination head 170 is located in the position shown in solid lines in FIG. 2., it is positioned to project onto CCD 113 an image of a moving document presented by the document handler to an exposure position 115. The illumination head 170 and mirrors 110 are movable by a pulley system, not shown, to scan an image of a document or other object manually placed on an exposure platen or glass 116 onto CCD 113. The document may be manually positioned by pivoting or raising the portion of the feeder that includes the input tray which thereby provides access for placement of the document on the platen.

The document handler 16 includes a document supply or input tray 120 into which a multisheet (or single sheet) document is placed face down. In response to pressing of a start button, S, by the operator, document sheets are fed one at a time from the bottom of the stack by a scuff separating device 121. The input tray 120, is inclined from the horizontal to gain the assistance of gravity in the separating process. Documents separated from the stack are fed by a pair of feed rollers 122 along an input path 123, defined by registration guides and having a registration roller 128 to a turnover drum 124. Turnover drum 124 is driven by drum drive rollers 125 and 127 which in turn are driven by suitable means, not shown. The document is fed across the exposure position 115 by the combined action of the drum drive rollers 125 and 127 driving both the document and the turnover drum 124. The turnover drum 124 is held tight against the drum drive rollers 125 and 127 to assure location of the document in the object plane of the objective 112.

If only one side of the document is to be scanned, a separator or diverter, not shown, is moved to a raised position which strips the document from turnover drum 124 and allows it to be fed by a simplex exit roller 131 into a simplex exit tray 132. Because the documents are placed face down in the document input tray 120 and are fed in that position across the exposure position 115 and into the simplex exit tray, and new documents are fed into the simplex exit tray on top of preceding documents, the stack of documents in the simplex exit tray ends up in the same order and orientation as in the document input tray 120.

The logic package consists of control software, interface software and logic hardware, including one or more microprocessors. Setup instructions are input to the scanner, while synchronization signals to identify separate scan lines and to provide page information and marking engine control, as well as information for finishing and processing of jobs, will be sent to marking engine 12 via a job control communications link 28. The marking engine may comprise an ink jet, thermal, photographic or electrostatographic marking engine wherein a source of electrical signals modifies a writer to print images in accordance with electronic signals. Electrophotographic marking engines such as electrophotographic marking engines using LEDs or laser writers are preferred which modulate light with image data to record on a photoconductive recording medium. Modulated electrostatic images on the medium are developed with electroscopic toners and transferred to a record copy such as plain paper or plastic sheets; see for example U.S. Pat. No. 4,949,190, the pertinent contents of which are incorporated herein by reference. The invention may be used with binary or grey level printers as is known in the art.

Figure 3:
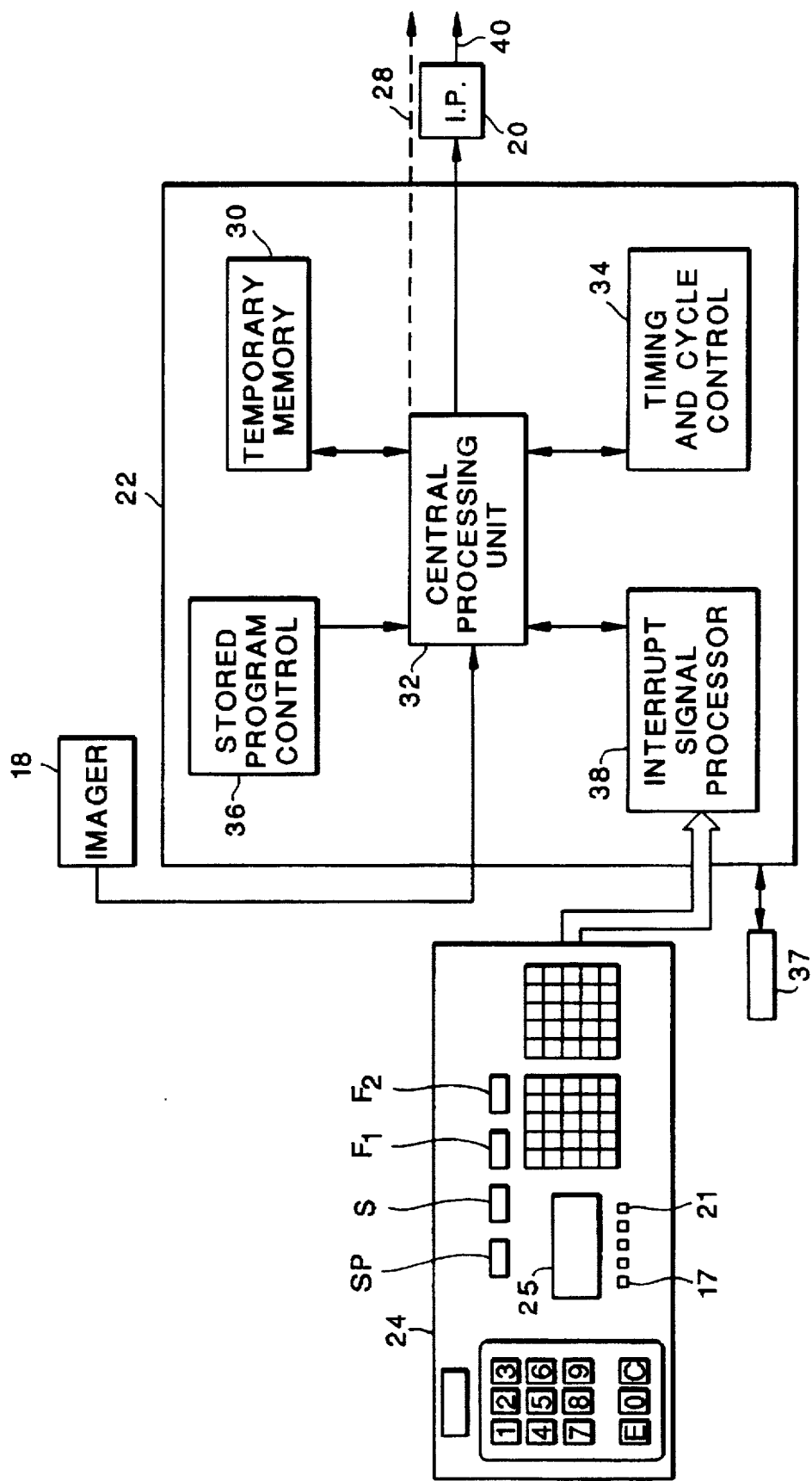
FIG. 3 is a schematic view illustrating in more detail portions of the copier apparatus of FIG. 1.

FIG. 3 includes a more detailed block diagram of control logic package 22 and operator control panel (OCP) 24 with soft-key-provided LCD display screen 25. Display screen 25 provides text, graphics and soft key selections. Messages and graphics are used to guide the operator through the various modes of operation explained below.

The control logic package comprises temporary data storage memory 30, central processing unit 32, timing and cycle control unit 34, and stored program control 36. Data input and output is performed sequentially under program control. Input data are received from imager 18 in the form of an 8-bits per pixel video stream of data. Setup and control signals are received either from operator control panel 24 or a removable memory media 37 through an interrupt signal processor 38. The output data is applied through processing electronics 20 and an image data bus 40, and control signals are applied via control communications link 28, to marking engine 12.

Referring again to FIG. 1 marking engine 12 receives bit stream image data over bus 40 and job control data over a communications link 28, both for storage in a multiple page buffer memory 58. The page buffer will accept electronic image data from scanner 14 and store that data until needed by a writer 62. The storage media is preferably a dynamic random access memory under the control of a memory management unit 60.

Control means, including a microcontroller 64 is arranged to perform arithmetic and logic operations and instruction decoding as well as controlling the time allocation of peripherals (such as a paper supply controller 66 and accessories communications for finishers, staplers, exit hoppers, etc.) through a machine control communications link 70. Several output functions may be available for receiver sheets including selection for output trays, stapling, sorting, folding, finishing, mailbox, envelope receiver, etc.

Microcontroller 64 has associated with it RAM for storing image location addressed, and a read-only memory 72 in which is stored various fixed forms such as test patterns, density patch patterns for process control purposes, billing forms, etc.

Figure 4:
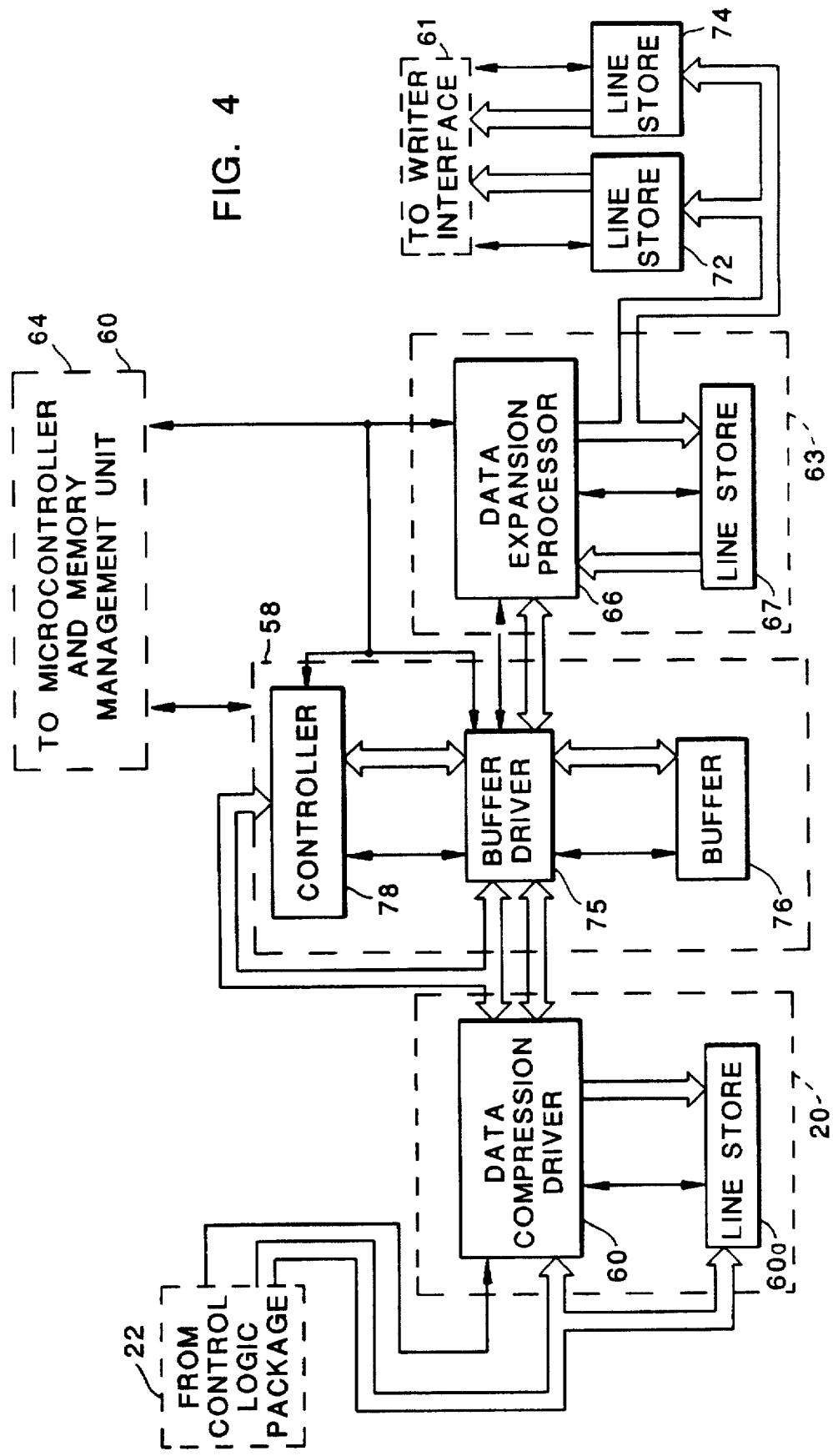
FIG. 4 is a schematic illustrating in more detail a job image buffer illustrated in FIG. 1.

With reference to FIG. 4, the image processor 20 may include a data compressor which receives the image data stream from imager 18. Data compressor is preferably a hardware implementation of an appropriate algorithm which encodes redundant information into a more compact form before passing the compressed data stream to a multi-page buffer memory 58. The data compressor includes a data stream compression driver 60 and a line store 60a for buffering a full line's worth of data.

A data expander 63 is the companion to the data compressor, and it includes a data expansion processor 66 and a line store 67. The expander retrieves the compressed data stream from multi-page buffer memory 58 and reconstructs the output data into original form for a writer interface 61. The writer interface receives a full line of image data from the data expander as the line is processed, and has a pair of line stores 72 and 74 and random logic to resequence the data stream before sending it to printhead or writer 62.

Multi-page buffer memory 58 also known as a job image buffer or JIB is provided for storing image data of all the pages in each production job to permit the electronic recirculation of images for collation; thereby eliminating the need for a mechanical recirculating document handler. The heart of the multi-page buffer memory is a large bank of dynamic random access memory (DRAM) in a buffer 76 for storage of the image data as it is processed by data compressor 20. The buffer memory is large enough to store the data for several production jobs simultaneously wherein each job is of multiple pages.

Controller 78 and buffer driver 75 act as a direct memory access controller, allowing data compressor 20 and expander 64 direct access to DRAM buffer 76 without a microprocessor, and as a DRAM controller arbitrating between memory read, write and refresh cycles.

The microcontroller 64 functions as the system manager, overseeing the overall operation of the multi-page buffer memory, the microcontroller will handle communication with a logic and control unit (LCU) (not shown) of the marking engine, store the internal pointers identifying the beginning and ending addressed for each image, initiate transfers from the scanner assembly 14 and control the data compression and expansion process. The microcontroller and LCU comprise electronic collation means for presenting the stored image data for printing in the proper sequence, as often as it needed to produce the desired number of collated document sets whereby a plurality of electronically collated, multi-page sets can be printed as known in the prior art.

Assuming an operator has placed an original multisheet document set to be copied into a document feed hopper and set up the parameters for a copy job, e.g., number of copies for reproducing the document set and other conventional parameters, the control logic package 22 is programmed to operate as set forth below. In response to pressing of the "START" button, S, on the OCP 24, a decision is made as to whether or not documents are in the automatic document feeder (ADF). As noted above, the ADF may be a recirculating document feeder (RDF) wherein documents that are stored in a hopper are circulated to an exposure platen in serial fashion and returned to the hopper. At the exposure platen or glass which is part of imager 18, the document sheets are scanned or read during the sheet feeding operation to generate electronic signals representing the density of image information on the sheets. The ADF may also be a feeder where the documents are presented seriatim and automatically to the platen and are then fed to a stack or hopper at a different location from which originally presented. In any event, if documents are sensed by suitable known sensors to indicate that this is an ADF job, scanning of the originals in serial fashion for image information is made by the scanner. The scanner may also include scanning for automatic document recognition (ADR), see U.S. Pat. No. 4,922,350, which describes a prescan for ADR determination. As the document sheets are fed seriatim to or from the scanner, a count is made by well known means of the number of document sheets fed during this sheet feeding operation. Where scanning of a document set is made comprising a copy job, a count is kept of the number of document sheets scanned. There is also displayed on display screen 25 an indication that processing for printing of the requested number of copy sets has begun. This processing can include subjecting the incoming data to edge enhancement and/or compression, the latter to make efficient use of memory space in buffer 76. As is well known, the feeder may comprise a housing that includes a hopper for storing document sheet originals above the platen. The housing can also include the feeder devices and sensors. The housing may be lifted to allow an operator access to the glass to position a document sheet say face down on the glass for scanning by the electronic scanner device located beneath the glass. Of course, other types of scanning stations are contemplated including a separate scanner for feeder mode and one for glass mode scanning.

Figure 5:
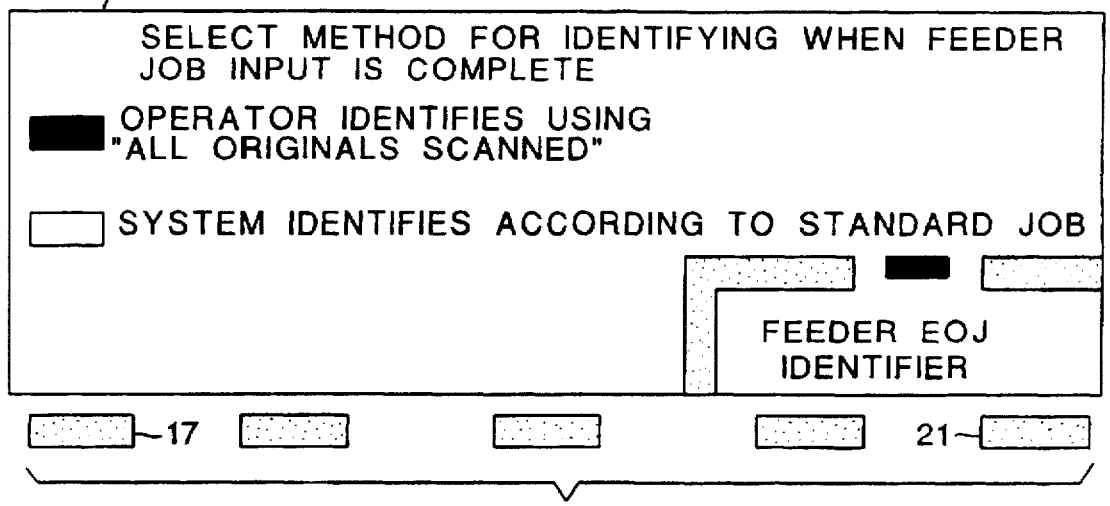
FIG. 5 illustrates a screen display that may be used in accordance with the invention to allow an operator to enter an option wherein the operator identifies the end of the job for scanning document sheets forming a copy job.

Before a copy job is started, the operator will have the option to select a special feature selection called END OF JOB (EOJ) IDENTIFIER (See FIG. 5). This special feature may be called up on the display screen 25 by pressing one of the special feature buttons $F_1$, $F_2$ on the OCP and/or in response to placement of originals in the feeder input tray. This feature has two choices: System Determined or Operator Determined. The EOJ IDENTIFIER is set to Operator Determined by the operator pressing soft key 21 which causes an "x" or other darkened indicia representing a selection to be present in the box adjacent the words "'Operator Identifies Using "ALL ORIGINALS SCANNED."' The box above the word FEEDER also is darkened to indicate the default mode is deselected. When this mode is deselected, the system will not complete the job until the user indicates that all originals have been scanned. This can be done at various points in the job. The default selection will be "System Determined," that is, the system will assume that the job is a standard job and when the last sheet is fed from the ADF's input tray and scanned all of the originals in this copy job are considered to have been scanned. The default selection may also be obtained by again pressing soft key 21 which causes the default option to be selected because one is able to scroll between the two available options.

Figure 6:
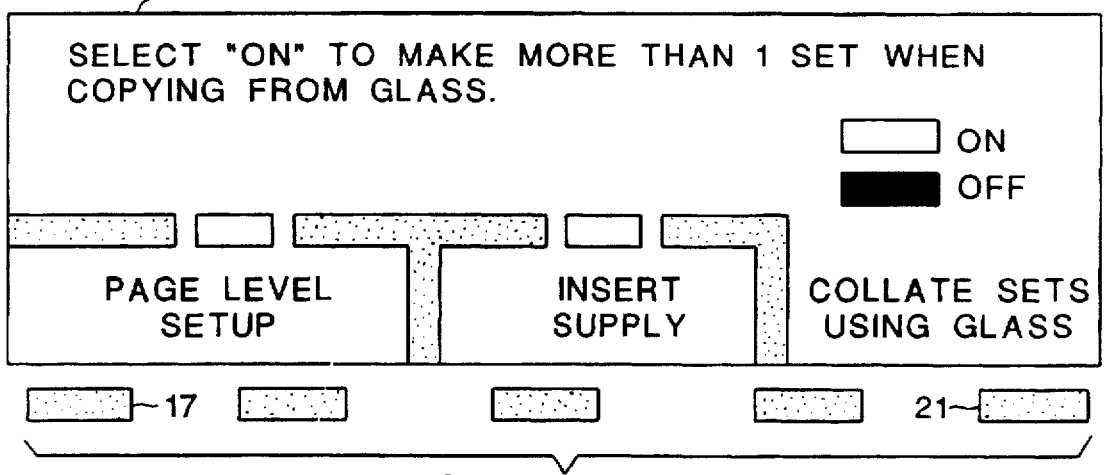
FIGS. 6, 7, 8, 9, 10 and 11 illustrate additional screen displays that may be used in accordance with the invention.

In addition to identifying how the end of the job is determined, the operator also calls up using the special feature button(s) a collate off platen (COP) mode. In response to this call up the display of FIG. 6 is displayed on display screen 25. As noted, the COP mode is a known mode used on the aforementioned KODAK 1575 Copier/Duplicator for scanning originals manually presented to the glass or platen. By pressing soft key 21, the COP mode can be selected. As may be seen in FIG. 6 other options displayed include the ability to call up prompts for page level setups, and for designating an insert supply. With the COP mode selected and any page level setups made using other display screens of the prior art still another special feature may be selected for this copy job using the special features buttons and which will be called herein "express glass mode" (EGM) scanning. In EGM scanning, a document sheet to be scanned is placed on the glass or platen before feeding begins or before feeding resumes after a pause. After the feeder resumes feeding and scanning of document sheets and then feeds a key sheet the feeder will pause briefly and the document sheet on the platen is scanned automatically and feeding from the feeder then automatically recommences after the document on the platen is scanned. In this mode, the feeder's pause is only for a short period for which a scan of the document sheet on the platen requires no further action by the operator after setup. If there is a subsequent "pause" key sheet in the stack, the document sheet on the glass and previously scanned in the EGM. can be removed since a pause key sheet causes the feeder to stop and waits for the operator to intervene and then restart the scanning of the copy job by pressing the start button.

Figure 7:
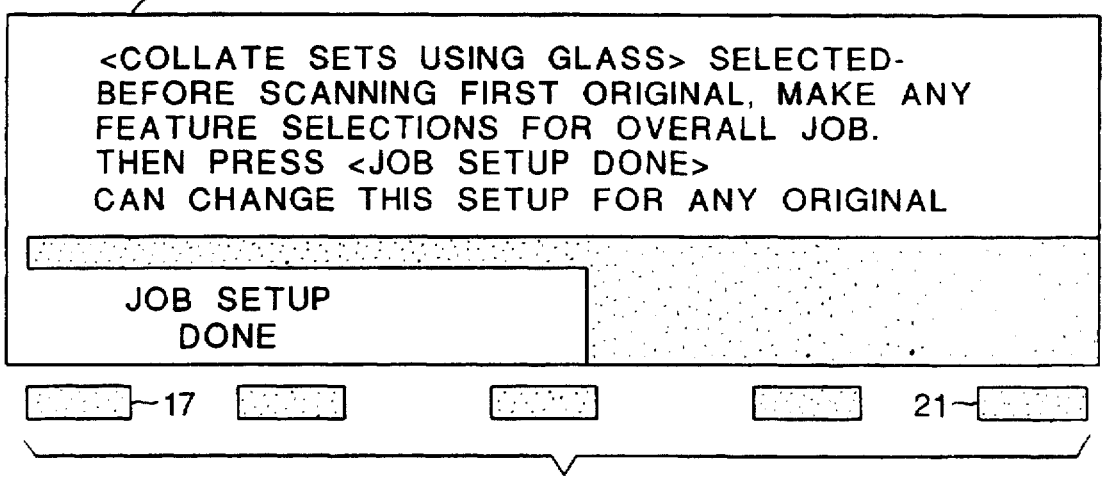

After the various special features are programmed and stored by the CLP 22, the CLP 22 provides the display of FIG. 7 that notes COP has been selected and that the operator may make any feature selections for the overall job. Assume that these feature selections have been made previously such as number of copy sets, duplex or simplex copying, paper supply selected, etc., the operator presses soft key 17 to input a signal to the CLP 22 that the job setup is done. In response to this signal, the CLP 22 calls up the display of FIG. 8 prompting the operator to place on the platen the first original to be scanned in the copy job. The operator is also prompted to press the START button to begin scanning off the platen. The display of FIG. 8 also provides options to change to the feeder mode, which is selected by pressing soft key 17, and to cancel the job by pressing soft key 21. If soft key 17 is pressed, the CLP 22 responds to the signal indicating this input and calls up the display of FIG. 9 to be presented to display screen 25 thereby providing a prompt to the operator to press START to commence the job by scanning from the feeder.

Figure 8:
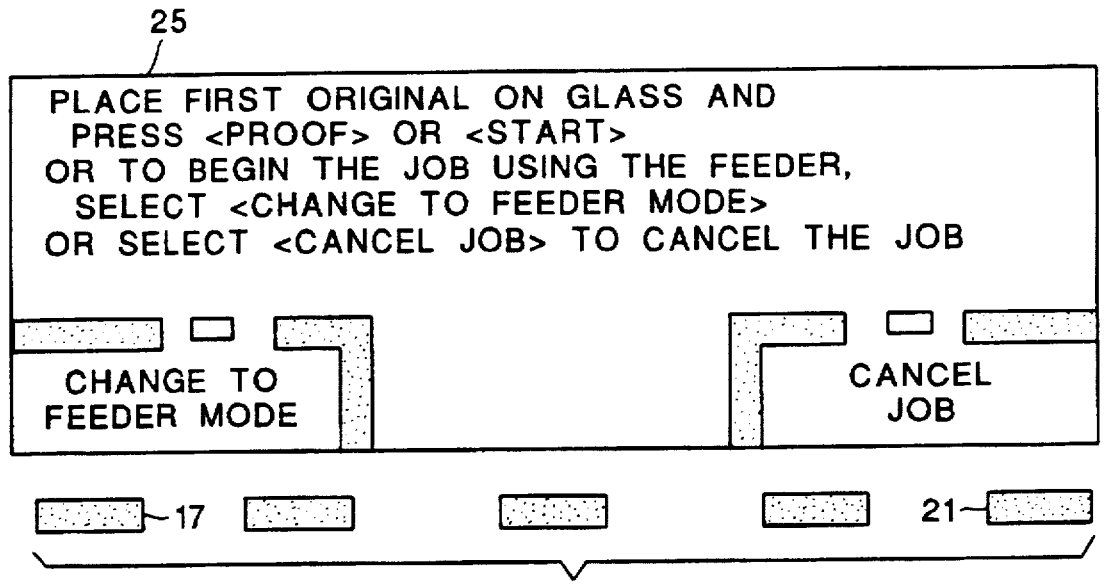

Platen initiated jobs using collating sets using the glass (COP) and the EOJ identifier set to Operator Determined will allow originals to be scanned from the glass including the first document in the set of document sheets to be scanned for this copy job. To begin scanning of this first sheet the first sheet is placed on the glass by lifting the cover; the cover may be then closed or left up and the START button pressed. This will cause operation of the scanner as described above to scan the image information on the first sheet. Note this first sheet is scanned while on the glass without use of a key sheet placed in the input tray. If it is desired instead to switch to the feeder mode where document sheets in the tray are fed first from the feeder the soft key 17 in FIG. 8 is pressed which generates a signal to the CLP 22 and causes the display of FIG. 9 to be displayed on display screen 25. Scanning of document sheets fed by the ADF may begin for this copy job by pressing the START button. After every platen scan, the display of FIG. 10 will be displayed instructing the user to continue to use the platen by pressing the start button (or proof button, not shown) or indicate that all originals have been scanned, thus the job is complete. A third choice is to switch to the ADF as the source for scanning originals by pressing soft key 17 while the displays of either FIG. 8 or FIG. 10 are displayed. If the ADF is selected by pressing this key, the display of either FIG. 9 or FIG. 11, respectively, is called up. All permitted ADF operations may be allowed and feeding of document sheets to the scanner commences when the START button is pressed.

If the first document sheet is scanned from the glass or platen, the CLP 22 now provides on the display screen the display of FIG. 10 allowing the operator to place a second document sheet on the glass for scanning the next copy sheet in the document set. Indeed, in the COP mode, after any sheet is scanned from the platen, the display of FIG. 10 is provided to allow further sheets to be scanned from the platen without need for additional key sheets since the operating mode remains as one for scanning from the platen mode.

When the ADF input tray becomes empty (note the operator has switched from using the platen to using the ADF and the input tray has become empty) a display menu (not shown) may be displayed instructing the user to place more originals in the ADF and press start (or proof) to begin scanning these originals in the ADF's input tray or indicate that all originals have been scanned, thus the job is complete. Availability of said display menu is controlled by the setting of "Feeder EOJ Identifier" to the Operator Identifies option. A third choice available is to select the platen using the soft key 17 as the new source of document entry (see FIG. 10) allowing the job to continue by scanning from the platen. The above process is repeated until all originals scanned has been indicated. Pressing of the various soft keys 17, 21 provides signals to the CLP 22 causing the operation of the copier to adjust its programmed operating mode to that identified by the display above the key.

Platen initiated jobs using collating sets using the glass and the EOJ identifier set to "System Determined" will behave the same as above except when the ADF is selected and the input tray becomes empty, the job will be complete without operator interaction. No additional scanning is allowed for the current job after the job is complete.

Figure 9:
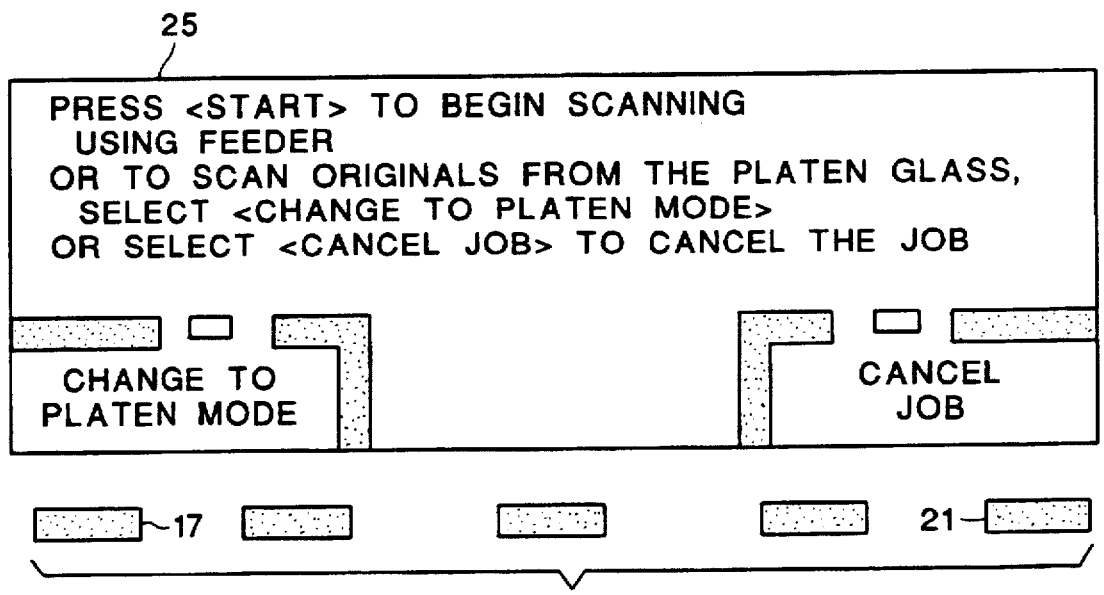
Figure 10:
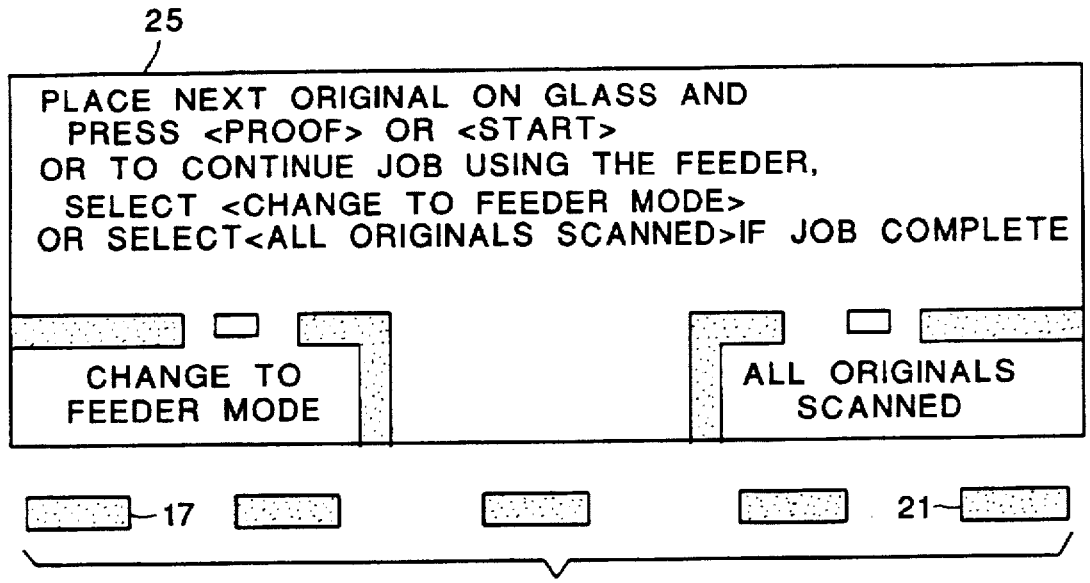
Figure 11:
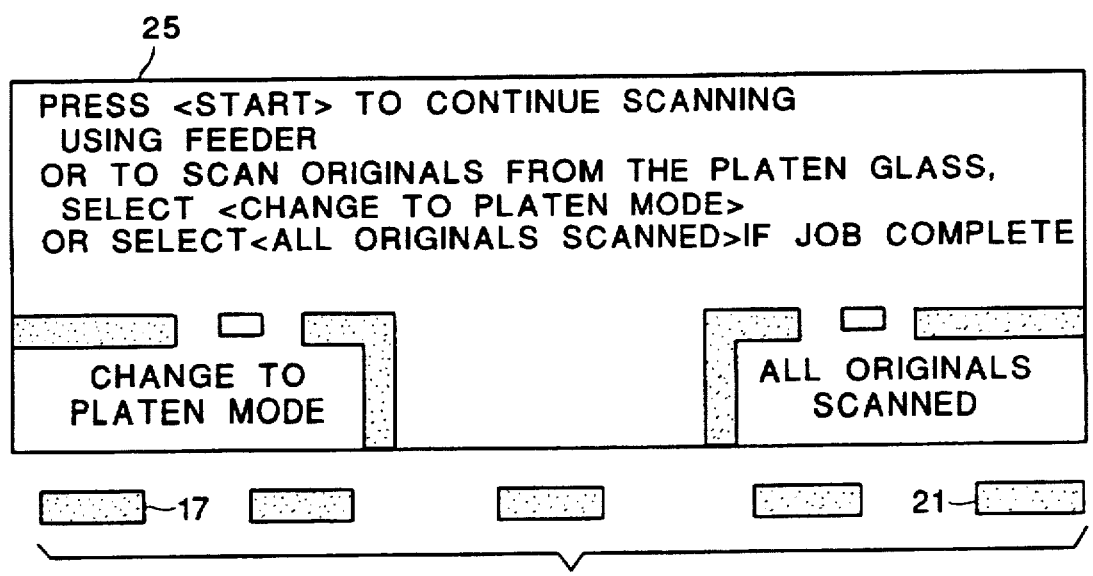

As noted above, the CLP 22 calls up for display the display screen of FIG. 9 after the operator presses soft key 17 to indicate that the operator requests a change to feeder mode when the display screen of FIG. 8 is displayed. If the START button is now pressed, original document sheets will be caused to be fed seriatim to the scanner and the data thereon scanned and stored in the JIB. If scanning was begun at the platen and then a request input to change to feeder mode the display of FIG. 11 is called up by the CLP 22 and upon pressing the start button document sheets in the ADF's input tray will be caused to be fed seriatim to the scanner and the data thereon scanned and stored in the JIB. Feeding of the documents from the feeder will stop when the last document is fed from the input tray and no further document sheets remain therein as sensed by sensors associated with the tray or when a key sheet is fed and sensors in the feeder sense the key sheet.

In this copier, provision may be made through programming in the CLP 22 for the user to be allowed to pre-define key sheets. For example, in the job setup, the user may select duplex for the job but after sensing key sheet #3, the copier mode may be switched to have the next sheet be processed in simplex or until key sheet #4 is detected. Another example may be that the user may program the operating mode to scan the originals following key sheet #6 from the platen and use image reverse and a contrast setting of 7 (highest contrast). If the user places an original document sheet on the platen and places in the input tray those document sheets to be fed by the ADF, when key sheet #6 is detected, the ADF will stop feeding document sheets and the CLP will call up the display of FIG. 10 on display screen 25 and when the START button is pressed, the document sheet placed on the platen will be scanned and its image data processed in accordance with the preprogrammed inputs for the key sheet that caused the pause in the feeder mode to be created. The display of FIG. 10 will still be present after the last mentioned document sheet is scanned. Thus, additional document sheets may be scanned from the glass and copied in accordance with the preprogrammed instructions for the last key sheet. As the COP mode is on, the operator is able to indicate using soft key 21 that all originals are scanned even if he has previously selected that the system is to identify the end of the job because the system identifies an end of a job by detecting that a feeder is empty. There is thus provided extra flexibility in defining when the job ends. After copying document sheets from the platen, soft key 17 may be pressed causing the display of FIG. 11 to be called up. Upon pressing of the start button, the feeder mode will once again be enabled. If there are more documents in the ADF, the feeder will resume and complete its scanning process. The job will be completed based on the FEEDER EOJ IDENTIFIER. That is, where the "operator identifies" has been selected, the soft key 21 in FIG. 11 may be pressed to indicate that all originals in this copy job have been scanned. If the "system identifies" is selected or defaulted to the fact that the input tray is empty will cause the job of scanning for this copy job to be over. If the COP mode has been selected in the special feature menu and a change made to scan from the platen, the operator is required to indicate that all originals are scanned.

Figure 12A:
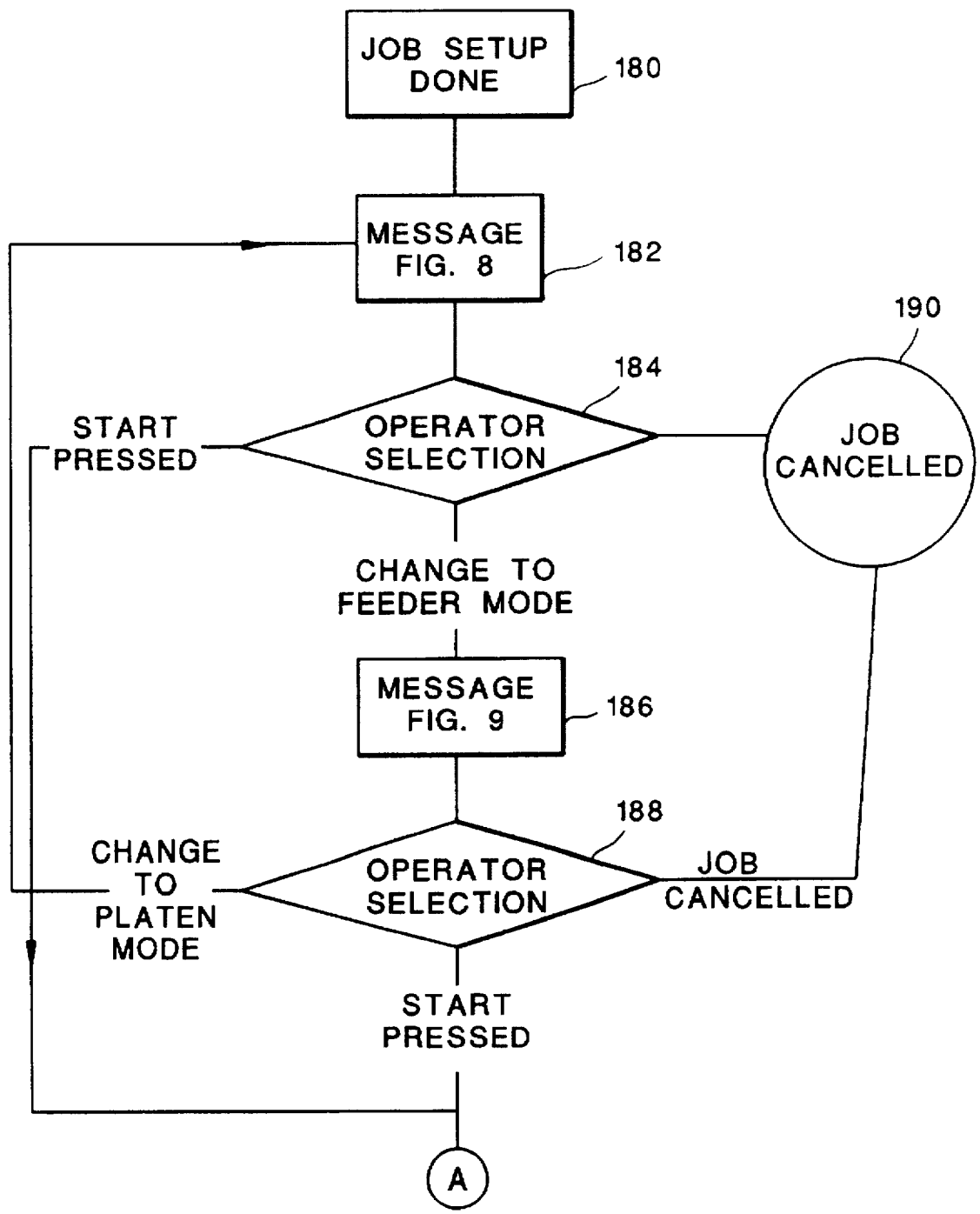

With reference now to FIGS. 12A and 12B, a flowchart of operation of the copier apparatus is illustrated. After job setup is completed (step 180) and assuming COP mode is selected by the operator the message of FIG. 8 is called up for display (step 182) which provides various options (step 184) of starting the scanning portion of the copy job. The assumption is that since the COP mode has been selected by the operator that scanning is more likely to commence with inputs from the glass. When COP mode is not selected as a feature it is assumed that scanning is more likely to commence with inputs from the feeder and so the display of FIG. 9 is presented. When the display of FIG. 8 is called up, the operator may press soft key 17 to change to the feeder mode or press soft key 21 to cancel the job (step 190). A third option is to place the first document sheet on the platen and then press START to scan the first document sheet in this copy mode. If the operator selects change to feeder mode, the display screen of FIG. 9 is called up for display (step 186). This display screen, too, offers several options for operator selection (step 188) including a change back to the display screen of FIG. 8, if a change to platen mode is desired, or cancellation of the job, or proceeding with scanning from the feeder by pressing START. Upon pressing of the start button, the controls in CLP 22 check the signals from the sensor in the ADF's input tray to determine if there are any document sheets in the feeder's input tray (step 200). If there are document sheets in the tray, a check is made for a flag to determine if this is a copy job where the system chooses EOJ or the operator chooses EOJ. Also, a determination is made as to whether or not the first sheet is to be scanned from the feeder or the platen in accordance with inputs as noted above using input(s) in response to displays of FIGS. 8 and 9 (step 210). If the feeder is selected for the first sheet, the collated off of the platen (COP) mode is set to be "on" even if the COP mode has not been selected by the operator as a special feature. The feeder then executes a feeder scan of this first sheet and subsequent sheets (step 220). If there is a feeder jam or pause key sheet sensed by sensors in the feeder or the operator has pressed a STOP button (SP) on the OCP or the ADF's input tray is determined by the sensors associated with the tray to be empty, the feeder stops (step 230). If only the input tray is sensed to be empty (step 240), the feeder mode is checked for whether the operator or the system determines EOJ (step 250). If a flag in the system indicates that the system chooses EOJ, the job of scanning in the copy sheets for this job is completed (step 260). If the flag is such that the operator chooses EOJ or there is determined to be a jam (which is subsequently cleared) or a pause key sheet that is sensed or the STOP button was pressed, then the display of FIG. 11 is displayed (step 310). At this point, the operator may choose to change to the platen mode, to indicate that all originals are scanned or to press the START button to resume scanning from the ADF (step 320). Note if a jam occurs, feeding and/or scanning will not begin until the jam is cleared and the start button is pressed. If the input tray is determined to be empty, a display message is provided to place originals in the tray (step 340). Upon sensing that originals are placed in the tray, the display of FIG. 11 is provided (step 310).

If the determination is made in step 330 that document sheets are in the feeder input tray the process returns to step 220. If, in step 320, the operator selects a change to platen mode, the display message of FIG. 10 is called up and displayed (step 290). If the operator places a document sheet on the platen or there is one already present on the platen and the START button is pressed (step 300), scanning of the document sheet on the platen is made (step 270). If, however, in step 300 the operator indicates via soft key 21 that all originals are scanned, then the operation of scanning in all of the originals for this copy job is complete (step 350).

After executing a platen scan in step 270, a check is made to see if collating off the platen (COP) mode is "on." If it is, the display message of FIG. 10 is again displayed (step 290) to allow operator selection of a second document sheet for scanning off of the platen even though only one key sheet has been sensed in step 240. If the START button is pressed, the COP mode is retained by looping back to step 270 as many times as the operator desires to have document sheets scanned from the glass. If, however, the operator selects in this cycle to indicate that all documents have been scanned (step 300) the job of scanning in originals for this copy job is complete (step 350). An additional selection (step 300) may be made when the display of FIG. 10 is displayed to change to the feeder mode. If the feeder mode is selected, the display message of FIG. 11 is provided (step 310). In such a case, the operation is identical as described above for steps 320, 330, 340, 350 and 220.

If there is a determination made in step 210 that the platen mode is first selected, operation of the process is as follows: In step 270 a platen mode is executed to scan the first copy sheet. A check is made if the COP mode is "on" based on selection as a special feature during setup (step 280). Assume COP has been selected and the display of FIG. 10 is called up (step 290) to indicate the next original may be placed on the glass to be scanned. The operator can now select (step 300) either to indicate the job is complete using soft key 21 (step 350) or to change to the feeder mode using soft key 17, or to press the start button and have the next scan executed from the platen. If soft key 17 is pressed, the CLP 22 calls up the display of FIG. 11 (step 310) This display as noted above allows selection of various options (step 320) including indicating the scanning job is complete by pressing soft key 21, or changing back to the platen mode to return to the display of FIG. 10 by pressing soft key 17, or to press the start button. If the start button is pressed, a determination is made (step 320) as to whether or not there is any paper in the feeder tray. If the tray is empty, a message to that effect is provided (step 340). When the tray is provided with paper originals, the display of FIG. 11 is again called up. If paper is in the tray, the process enters the feeder mode (step 220) for scanning of document sheets as described above. If in step 320, the start button is pressed, a feeder scan is executed (step 220) on the first document sheet in the feeder and additional sheets may be scanned from the platen or the feeder as described above for steps 270–350 and 220.

In the discussion provided above, description was also provided of the mode called "express glass mode" (EGM). In this mode, a document sheet to be scanned as part of a copy job may be preplaced on the platen and a particular key sheet prepositioned in a known location in the stack of document sheet originals in the input feeder tray. As noted above, the location of this key sheet is preprogrammed into the CLP 22 by the operator and is identified to the CLP 22 as one that is an EGM key sheet. The scanner executes feeder scans in step 220. When a key sheet has been sensed that has been preprogrammed as an EGM key sheet (step 226), the feeder pauses (step 227) and the scanner automatically executes a platen scan (step 228) without the operator having to press start or provide any input. After executing this platen scan, the feeder automatically commences feeding sheets from the input tray to the scanner after first determining that the input tray is not empty.

Thus, with the flexible source document entry system described herein, the user will be allowed to switch from the platen and/or the ADF at any point of input to the job. It will allow for multiple pages to be scanned using the platen, per key sheet and will allow an operator to pre-program any number of key sheets in the job. The feature called END OF JOB IDENTIFIER gives the user the option to define when scanning of originals is complete using the ADF or the platen. This, added with the flexibility of switching to the platen, and scanning to a JIB, allows a significant increase in the type of originals that can be scanned and finished as one job. It also allows the user to build jobs in a variety of ways that results in higher productivity than could be achieved otherwise.

The copier apparatus and method of the invention will allow the user to select the ADF or the platen as a source for inputting originals at any point in a job. The user will have the option to tell the scanner when the job is complete. This will also allow the operator to pre-define page level setups that will be applied in copying of an original document sheet or group of original document sheets after a key sheet(s) is detected. All supported image processing features and valid finishing features may be pre-defined. The user may be allowed to pre-define a key sheet to switch to the platen as the source for one platen scan, and then resume using the ADF without future interaction by the user.

Although the invention has been described with reference to a copier apparatus with a specific marking engine, other known marking engines used in electronic copying may be substituted and used. Thus, marking engines using laser, LED, ink jet, electrographic and thermal recording, etc. may be substituted. In lieu of key sheets to program stops or pauses, the invention contemplates pre-programming of these stops or pauses by the operator.

The invention has been described in detail with particular reference to preferred embodiments thereof and illustrative examples, but it will be understood that variations and modifications can be effected within the spirit and scope of the invention.

We claim:

1. A copier apparatus comprising:

means including a scanning station for electronically scanning a set of document sheets to be copied as a copy job, the scanning station including a platen for supporting a document sheet to be scanned in a first mode wherein the document sheet is manually positioned on the platen by an operator and the scanning station including means for scanning document sheets in a second mode wherein document sheets are automatically fed;

feeder means for automatically feeding seriatim document sheets to the scanning station for scanning document sheets in the second mode;

recording means for copying images of said document sheets;

an operator control panel including display means for displaying an option for selection by an operator for scanning from the platen a document sheet from said set that is manually positioned on the platen and displaying an option for selection by an operator for scanning document sheets from said set using the feeder means and generating signals in response to selections of scanning of certain of said document sheets in said set using said first mode and other document sheets in said set using said second mode; and control means responsive to a signal actuating said scanning station for scanning said document sheet in said first mode and for controlling said operator control panel to again display on said display means an option allowing selection by an operator for scanning from the platen a next document sheet from said set that is manually positioned on the platen and displaying an option for selection by an operator for scanning document sheets from said set using the feeder means, said control means including means for actuating said recording means in response to said selections for producing a copy of said document set as a copy job.

2. The apparatus of claim 1 and including means for enabling said display means to display an option allowing the operator to identify that all document sheets of said set are scanned for this copy job.

3. The apparatus of claim 2 and including means for generating a signal in response to an input by an operator that represents that all document sheets of said set have been scanned and means responsive to said signal to preclude additional document sheets to be scanned as part of the copy job.

4. The apparatus of claim 3 and wherein said display means displays an option allowing selection of a first document sheet from said set to be scanned in said first mode.

5. The apparatus of claim 3 and wherein a display of an option for scanning in said first mode is generated in response to a key sheet fed by said feeder means.

6. The apparatus of claim 1 and wherein said display means displays an option allowing selection of a first document sheet from said set to be scanned in said first mode.

7. The apparatus of claim 6 and including means for enabling said display means to display an option allowing the operator to identify that all document sheets of said set are scanned for this copy job.

8. The apparatus of claim 1 and wherein a display of an option for scanning in said first mode is generated in response to a key sheet fed by said feeder means.

9. The apparatus of claim 1 and wherein in response to scanning of said document sheets in said set said recording means produces collated copies of said document set as a copy job.

10. A copier apparatus comprising:

means including a scanning station for electronically scanning a set of document sheets to be copied as a copy job, the scanning station including a platen for supporting a document sheet to be scanned in a first mode wherein the document sheet is manually positioned on the platen by an operator and the scanning station including means for scanning document sheets in a second mode wherein document sheets are automatically fed;

feeder means for automatically feeding seriatim document sheets to the scanning station for scanning document sheets in the second mode;

recording means for copying images of said document sheets;

an operator control panel including display means for displaying options including displaying an option for selection by an operator for scanning from the platen at least one of said document sheets of said set that is manually positioned on the platen and displaying an option for selection by an operator for scanning of document sheets of said set using the feeder means and displaying an option allowing the operator to identify that all document sheets of said set are scanned for this copy job;

means responsive to operator inputs in response to display of said options for generating signals representing selections by said operator to said options; and control means responsive to said signals for actuating said scanning station for scanning said document sheets in said first mode and said second mode and for actuating said recording means for producing collated copies of said document set as a copy job.

11. The apparatus of claim 10 and including means for generating a signal in response to an input by an operator that represents that all document sheets of said set have been scanned and means responsive to said signal to preclude additional document sheets to be scanned as part of the copy job.

12. The apparatus of claim 10 and wherein said display means displays an option allowing selection of a first document sheet from said set to be scanned in said first mode.

13. The apparatus of claim 10 and wherein a display of an option for scanning in said first mode is generated in response to a key sheet fed by said feeder means.

14. A method for copying document sheets comprising:

electronically scanning a set of document sheets to be copied as a copy job, the scanning being performed both in a first mode wherein a document sheet of said set is manually positioned on a platen by an operator and in a second mode wherein document sheets are automatically fed;

displaying on a display options for selection by an operator including displaying a first option for selection for scanning from the platen a document sheet from said set that is manually positioned on the platen and displaying a second option for selection by an operator for scanning of document sheets of said set using automatic feeding and generating a signal in response to selection of scanning of said document sheet in accordance with said first option;

in response to said signal scanning said document sheet in said first mode and again displaying an option allowing selection for scanning of a next document sheet from said set in said first mode or said second mode, and in response to selections from said options producing a copy of said document set as a copy job.

15. The method of claim 14 and including displaying an option allowing the operator to identify that all document sheets of said set are scanned for this copy job; and generating a signal in response to an input by an operator that represents that all document sheets of said set have been scanned and in response to said signal precluding additional document sheets to be scanned as part of the copy job.

16. The method of claim 15 and wherein one of said options allows selection of a first document sheet from said set to be scanned in said first mode.

17. The method of claim 16 and wherein a display of an option for scanning in said first mode is generated in response to a key sheet fed by said feeder means.

18. The method of claim 14 and wherein one of said options allows selection of a first document sheet from said set to be scanned in said first mode.

19. The method of claim 18 and including displaying an option allowing the operator to identify that all document sheets are scanned for this copy job; and generating a signal in response to an input by an operator that represents that all document sheets of said set have been scanned and in response to said signal precluding additional document sheets to be scanned as part of the copy job.

20. The method of claim 14 and wherein a displaying of an option for scanning in said first mode is generated in response to a key sheet that is automatically fed.

21. The method of claim 14 and wherein in response to scanning of said document sheets in said set there is produced collated copies of said document set as a copy job.

22. A method for copying document sheets comprising:

electronically scanning a set of document sheets to be copied as a copy job, the scanning being performed both in a first mode wherein a document sheet is manually positioned on the platen by an operator and in a second mode wherein document sheets are automatically fed;

displaying options on a display for selection by an operator including displaying a first option for selection by an operator for scanning from the platen at least one of said document sheets that is manually positioned on the platen and displaying a second option for selection by an operator for scanning of document sheets of said set using automatic feeding and displaying a third option allowing the operator to identify that all document sheets of said set are scanned for this copy job;

in response to operator inputs, that are in response to display of said options, generating signals representing selections by said operator to said options; and in response to said signals scanning said document sheets in said first mode and said second mode and producing collated copies of said document set as a copy job.

23. The method of claim 22 and including generating a signal in response to an input by an operator that represents that all document sheets of said set have been scanned and in response to said signal precluding additional document sheets to be scanned as part of the copy job.

24. The method of claim 22 and wherein one of said options allows selection of a first document sheet from said set to be scanned in said first mode.

25. The method of claim 22 and wherein a display of an option for scanning in said first mode is generated in response to a key sheet being automatically fed.

26. A copier apparatus comprising:

means including a scanning station for electronically scanning a set of document sheets to be copied as a copy job, the scanning station including a platen for supporting a document sheet to be scanned in a first mode wherein the document sheet is manually positioned on the platen by an operator and the scanning station including scanning means for scanning document sheets in a second mode wherein document sheets are automatically fed;

feeder means for automatically feeding seriatim document sheets to the scanning station for scanning document sheets in the second mode;

recording means for copying images of said document sheets of said set for producing collated copies of said document set as a copy job;

means for indicating an option for selection by an operator of an operating mode wherein a document sheet from said set is prepositioned on said platen and is scanned automatically between document sheets of said set that are scanned in said second mode and generating a signal in response to selection of said operating mode; and control means responsive to said signal for actuating said feeder means for feeding document sheets from said set to said scanning station and for actuating said scanning means to scan document sheets fed to said scanning station, said control means including means for automatically and without operator intervention interrupting feeding of document sheets to said scanning station by said feeder means and for automatically and without operator intervention commencing a scan of the document sheet prepositioned on said platen and for automatically and without operator intervention recommencing feeding of document sheets to said scanning station by said feeder means.

27. A method for electronically scanning a set of document sheets to be copied as a copy job, the scanning being performed in a first mode wherein a document sheet is manually positioned on a platen by an operator and in a second mode wherein document sheets are automatically fed, the method comprising the steps of:

displaying an option for selection by an operator of an operating mode wherein a document sheet from said set is prepositioned on said platen and is scanned automatically between document sheets of said set that are scanned in said second mode and generating a signal in response to selection of said operating mode; and, in response to said signal, feeding document sheets from said set for scanning the document sheets electronically and automatically and without operator intervention:

(a) interrupting feeding of document sheets, (b) commencing a scan of the document sheet prepositioned on said platen, and (c) recommencing feeding of document sheets for scanning.

28. The method of claim 27 in combination with the step of, after scanning each document sheet once for image information thereon, producing collated copies of said set of document sheets as a copy job.

* * * * *